United States Patent
Krishnan et al.

(10) Patent No.: US 10,526,821 B2
(45) Date of Patent: *Jan. 7, 2020

(54) KEYLESS VEHICLE DOOR LATCH SYSTEM WITH POWERED BACKUP UNLOCK FEATURE

(71) Applicant: Ford Global Technologies, LLC, Dearborn, MI (US)

(72) Inventors: Venkatesh Krishnan, Canton, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/800,685

(22) Filed: Nov. 1, 2017

(65) Prior Publication Data

US 2018/0051493 A1 Feb. 22, 2018

Related U.S. Application Data

(63) Continuation of application No. 14/468,634, filed on Aug. 26, 2014, now Pat. No. 9,909,344.

(51) Int. Cl.
*E05B 81/56* (2014.01)
*E05B 81/80* (2014.01)
(Continued)

(52) U.S. Cl.
CPC .............. *E05B 81/56* (2013.01); *E05B 81/80* (2013.01); *E05B 81/82* (2013.01); *E05B 81/86* (2013.01);
(Continued)

(58) Field of Classification Search
CPC ...................................................... E05B 81/56
See application file for complete search history.

(56) References Cited

U.S. PATENT DOCUMENTS

| 2,229,909 A | 1/1941 | Wread |
| 2,553,023 A | 5/1951 | Walters |

(Continued)

FOREIGN PATENT DOCUMENTS

| CN | 1375032 A | 10/2002 |
| CN | 1232936 C | 12/2005 |

(Continued)

OTHER PUBLICATIONS

Kisteler Instruments, "Force Sensors Ensure Car Door Latch is Within Specification," Article, Jan. 1, 2005, 3 pages.

(Continued)

*Primary Examiner* — Alex C Dunn
(74) *Attorney, Agent, or Firm* — Vichit Chea; Price Heneveld LLP

(57) ABSTRACT

A keyless door latch system for doors of motor vehicles includes a backup electrical power supply to unlock the door latch in the event the primary power supply fails, thereby eliminating the need for a lock cylinder. The latch system includes a user input device having first and second user input features. The door latch system is configured to supply electrical power from the primary electrical power supply to unlock the latch upon actuation of the first user input feature, and to supply electrical power from the backup electrical power supply to unlock the latch upon actuation of the second user input feature. The user input device may comprise a wireless portable device that generates first and second wireless signals upon actuation of the first and second user input features, respectively.

17 Claims, 5 Drawing Sheets

(51) Int. Cl.
*G07C 9/00* (2006.01)
*E05B 81/82* (2014.01)
*E05B 81/86* (2014.01)
*B60R 25/24* (2013.01)

(52) U.S. Cl.
CPC ........ *G07C 9/00182* (2013.01); *B60R 25/245* (2013.01); *G07C 2009/00634* (2013.01); *G07C 2009/00769* (2013.01)

(56) References Cited

U.S. PATENT DOCUMENTS

| | | |
|---|---|---|
| 3,479,767 A | 11/1969 | Gardner et al. |
| 3,605,459 A | 9/1971 | Van Dalen |
| 3,751,718 A | 8/1973 | Hanchett |
| 3,771,823 A | 11/1973 | Schnarr |
| 3,854,310 A | 12/1974 | Paull |
| 3,858,922 A | 1/1975 | Yamanaka |
| 4,193,619 A | 3/1980 | Jeril |
| 4,206,491 A | 6/1980 | Ligman et al. |
| 4,425,597 A | 1/1984 | Schramm |
| 4,457,148 A | 7/1984 | Johansson et al. |
| 4,640,050 A | 2/1987 | Yamagishi et al. |
| 4,672,348 A | 6/1987 | Duve |
| 4,674,230 A | 6/1987 | Takeo et al. |
| 4,674,781 A | 6/1987 | Reece et al. |
| 4,702,117 A | 10/1987 | Tsutsumi et al. |
| 4,848,031 A | 6/1989 | Yamagishi et al. |
| 4,858,971 A | 8/1989 | Haag |
| 4,889,373 A | 12/1989 | Ward et al. |
| 4,929,007 A | 5/1990 | Bartczak et al. |
| 5,018,057 A | 5/1991 | Biggs et al. |
| 5,039,145 A * | 8/1991 | Frye ........................ E05B 85/12 292/143 |
| 5,056,343 A | 10/1991 | Kleefeldt et al. |
| 5,058,258 A | 10/1991 | Harvey |
| 5,074,073 A | 12/1991 | Zwebner |
| 5,092,637 A | 3/1992 | Miller |
| 5,173,991 A | 12/1992 | Carswell |
| 5,239,779 A | 8/1993 | Deland et al. |
| 5,263,762 A | 11/1993 | Long et al. |
| 5,297,010 A | 3/1994 | Camarota et al. |
| 5,332,273 A | 7/1994 | Komachi |
| 5,334,969 A | 8/1994 | Abe et al. |
| 5,494,322 A | 2/1996 | Menke |
| 5,497,641 A | 3/1996 | Linde et al. |
| 5,535,608 A | 7/1996 | Brin |
| 5,547,208 A | 8/1996 | Chappell et al. |
| 5,551,187 A | 9/1996 | Brouwer et al. |
| 5,581,230 A | 12/1996 | Barrett |
| 5,583,405 A | 12/1996 | Sai et al. |
| 5,613,716 A | 3/1997 | Cafferty |
| 5,618,068 A | 4/1997 | Mitsui et al. |
| 5,632,120 A | 5/1997 | Shigematsu et al. |
| 5,632,515 A | 5/1997 | Dowling |
| 5,644,869 A | 7/1997 | Buchanan, Jr. |
| 5,653,484 A | 8/1997 | Brackmann et al. |
| 5,662,369 A | 9/1997 | Tsuge |
| 5,684,470 A | 11/1997 | Deland et al. |
| 5,744,874 A * | 4/1998 | Yoshida ............... B60R 16/0315 307/10.1 |
| 5,755,059 A | 5/1998 | Schap |
| 5,783,994 A | 7/1998 | Koopman, Jr. et al. |
| 5,802,894 A | 9/1998 | Jahrsetz et al. |
| 5,808,555 A | 9/1998 | Bartel |
| 5,852,944 A | 12/1998 | Collard, Jr. et al. |
| 5,859,417 A | 1/1999 | David |
| 5,895,089 A | 4/1999 | Singh et al. |
| 5,896,026 A | 4/1999 | Higgins |
| 5,896,768 A | 4/1999 | Cranick et al. |
| 5,898,536 A | 4/1999 | Won |
| 5,901,991 A | 5/1999 | Hugel et al. |
| 5,921,612 A | 7/1999 | Mizuki et al. |
| 5,927,794 A | 7/1999 | Mobius |
| 5,964,487 A | 10/1999 | Shamblin |
| 5,979,754 A | 11/1999 | Martin et al. |
| 5,992,194 A | 11/1999 | Baukholt et al. |
| 6,000,257 A | 12/1999 | Thomas |
| 6,027,148 A | 2/2000 | Shoemaker |
| 6,038,895 A | 3/2000 | Menke et al. |
| 6,042,159 A | 3/2000 | Spitzley et al. |
| 6,043,735 A | 3/2000 | Barrett |
| 6,050,117 A | 4/2000 | Weyerstall |
| 6,056,076 A | 5/2000 | Bartel et al. |
| 6,065,316 A | 5/2000 | Sato et al. |
| 6,072,403 A | 6/2000 | Iwasaki et al. |
| 6,075,294 A | 6/2000 | Van den Boom et al. |
| 6,089,626 A | 7/2000 | Shoemaker |
| 6,091,162 A | 7/2000 | Williams, Jr. et al. |
| 6,099,048 A | 8/2000 | Salmon et al. |
| 6,125,583 A | 10/2000 | Murray et al. |
| 6,130,614 A | 10/2000 | Miller |
| 6,145,918 A | 11/2000 | Wilbanks, II |
| 6,157,090 A | 12/2000 | Vogel |
| 6,181,024 B1 | 1/2001 | Geil |
| 6,198,995 B1 * | 3/2001 | Settles ................ B60R 16/0315 307/10.7 |
| 6,241,294 B1 | 6/2001 | Young et al. |
| 6,247,343 B1 | 6/2001 | Weiss et al. |
| 6,256,932 B1 | 7/2001 | Jyawook et al. |
| 6,271,745 B1 | 8/2001 | Anzai et al. |
| 6,305,737 B1 | 10/2001 | Corder et al. |
| 6,341,448 B1 | 1/2002 | Murray |
| 6,357,803 B1 | 3/2002 | Lorek |
| 6,361,091 B1 | 3/2002 | Weschler |
| 6,405,485 B1 | 6/2002 | Itami et al. |
| 6,406,073 B1 | 6/2002 | Watanabe |
| 6,441,512 B1 | 8/2002 | Jakel et al. |
| 6,460,905 B2 | 10/2002 | Suss |
| 6,470,719 B1 | 10/2002 | Franz et al. |
| 6,480,098 B2 * | 11/2002 | Flick ...................... B60R 25/04 307/10.2 |
| 6,481,056 B1 | 11/2002 | Jesse |
| 6,515,377 B1 | 2/2003 | Uberlein et al. |
| 6,523,376 B2 | 2/2003 | Baukholt et al. |
| 6,550,826 B2 | 4/2003 | Fukushima et al. |
| 6,554,328 B2 | 4/2003 | Cetnar et al. |
| 6,556,900 B1 | 4/2003 | Brynielsson |
| 6,602,077 B2 | 8/2003 | Kasper et al. |
| 6,606,492 B1 | 8/2003 | Losey |
| 6,629,711 B1 | 10/2003 | Gleason et al. |
| 6,639,161 B2 | 10/2003 | Meagher et al. |
| RE38,338 E * | 12/2003 | Yoshida .............. B60R 16/0315 307/10.2 |
| 6,657,537 B1 | 12/2003 | Hauler |
| 6,659,515 B2 | 12/2003 | Raymond et al. |
| 6,701,671 B1 | 3/2004 | Fukumoto et al. |
| 6,712,409 B2 | 3/2004 | Monig |
| 6,715,806 B2 | 4/2004 | Arlt et al. |
| 6,734,578 B2 * | 5/2004 | Konno .................... B60R 25/02 307/10.2 |
| 6,740,834 B2 | 5/2004 | Sueyoshi et al. |
| 6,768,413 B1 | 7/2004 | Kemmann et al. |
| 6,779,372 B2 | 8/2004 | Arlt et al. |
| 6,783,167 B2 | 8/2004 | Bingle et al. |
| 6,786,070 B1 | 9/2004 | Dimig et al. |
| 6,794,837 B1 | 9/2004 | Whinnery et al. |
| 6,825,752 B2 | 11/2004 | Nahata et al. |
| 6,829,357 B1 * | 12/2004 | Alrabady ............... H04L 9/0656 380/260 |
| 6,843,085 B2 | 1/2005 | Dimig |
| 6,854,870 B2 | 2/2005 | Huizenga |
| 6,879,058 B2 | 4/2005 | Lorenz et al. |
| 6,883,836 B2 | 4/2005 | Breay et al. |
| 6,883,839 B2 | 4/2005 | Belmond et al. |
| 6,910,302 B2 | 6/2005 | Crawford |
| 6,914,346 B2 | 7/2005 | Girard |
| 6,923,479 B2 | 8/2005 | Aiyama et al. |
| 6,933,655 B2 | 8/2005 | Morrison et al. |
| 6,948,978 B2 | 9/2005 | Schofield |
| 7,005,959 B2 | 2/2006 | Amagasa |
| 7,038,414 B2 | 5/2006 | Daniels et al. |
| 7,055,997 B2 | 6/2006 | Baek |
| 7,062,945 B2 | 6/2006 | Saitoh et al. |

(56) References Cited

U.S. PATENT DOCUMENTS

| | | |
|---|---|---|
| 7,070,018 B2 | 7/2006 | Kachouh |
| 7,070,213 B2 | 7/2006 | Willats et al. |
| 7,090,285 B2 | 8/2006 | Markevich et al. |
| 7,091,823 B2 | 8/2006 | Ieda et al. |
| 7,091,836 B2 | 8/2006 | Kachouh et al. |
| 7,097,226 B2 | 8/2006 | Bingle et al. |
| 7,106,171 B1 | 9/2006 | Burgess |
| 7,108,301 B2 | 9/2006 | Louvel |
| 7,126,453 B2 | 10/2006 | Sandau et al. |
| 7,145,436 B2 | 12/2006 | Ichikawa et al. |
| 7,161,152 B2 | 1/2007 | Dipoala |
| 7,170,253 B2 | 1/2007 | Spurr et al. |
| 7,173,346 B2 | 2/2007 | Aiyama et al. |
| 7,176,810 B2 * | 2/2007 | Inoue ............... G08G 1/09671 340/10.1 |
| 7,180,400 B2 | 2/2007 | Amagasa |
| 7,192,076 B2 | 3/2007 | Ottino |
| 7,204,530 B2 | 4/2007 | Lee |
| 7,205,777 B2 | 4/2007 | Schultz et al. |
| 7,221,255 B2 | 5/2007 | Johnson et al. |
| 7,224,259 B2 | 5/2007 | Bemond et al. |
| 7,248,955 B2 | 7/2007 | Hein et al. |
| 7,263,416 B2 * | 8/2007 | Sakurai ................ F02D 41/062 307/9.1 |
| 7,270,029 B1 | 9/2007 | Papanikolaou et al. |
| 7,325,843 B2 | 2/2008 | Coleman et al. |
| 7,342,373 B2 | 3/2008 | Newman et al. |
| 7,360,803 B2 | 4/2008 | Parent et al. |
| 7,363,788 B2 | 4/2008 | Dimig et al. |
| 7,375,299 B1 | 5/2008 | Pudney |
| 7,399,010 B2 | 7/2008 | Hunt et al. |
| 7,446,656 B2 | 11/2008 | Steegmann |
| 7,576,631 B1 * | 8/2009 | Bingle ..................... E05B 81/76 340/5.54 |
| 7,642,669 B2 | 1/2010 | Spurr |
| 7,686,378 B2 | 3/2010 | Gisler et al. |
| 7,688,179 B2 | 3/2010 | Kurpinski et al. |
| 7,705,722 B2 | 4/2010 | Shoemaker et al. |
| 7,747,286 B2 | 6/2010 | Conforti |
| 7,780,207 B2 | 8/2010 | Gotou et al. |
| 7,791,218 B2 | 9/2010 | Mekky et al. |
| 7,926,385 B2 | 4/2011 | Papanikolaou et al. |
| 7,931,314 B2 | 4/2011 | Nitawaki et al. |
| 7,937,893 B2 | 5/2011 | Pribisic |
| 8,028,375 B2 | 10/2011 | Nakaura et al. |
| 8,093,987 B2 | 1/2012 | Kurpinski et al. |
| 8,126,450 B2 | 2/2012 | Howarter et al. |
| 8,141,296 B2 | 3/2012 | Bern |
| 8,141,916 B2 | 3/2012 | Tomaszewski et al. |
| 8,169,317 B2 | 5/2012 | Lemerand et al. |
| 8,193,462 B2 | 6/2012 | Zanini et al. |
| 8,224,313 B2 | 7/2012 | Howarter et al. |
| 8,272,165 B2 | 9/2012 | Tomioka |
| 8,376,416 B2 * | 2/2013 | Arabia, Jr. ............... E05B 81/82 292/216 |
| 8,398,128 B2 * | 3/2013 | Arabia ................... E05B 77/06 292/1 |
| 8,405,515 B2 | 3/2013 | Ishihara et al. |
| 8,405,527 B2 | 3/2013 | Chung et al. |
| 8,419,114 B2 | 4/2013 | Fannon |
| 8,451,087 B2 | 5/2013 | Krishnan et al. |
| 8,454,062 B2 | 6/2013 | Rohlfing et al. |
| 8,474,889 B2 | 7/2013 | Reifenberg et al. |
| 8,532,873 B1 | 9/2013 | Bambenek |
| 8,534,101 B2 | 9/2013 | Mette et al. |
| 8,544,901 B2 | 10/2013 | Krishnan et al. |
| 8,573,657 B2 | 11/2013 | Papanikolaou et al. |
| 8,584,402 B2 | 11/2013 | Yamaguchi |
| 8,601,903 B1 | 12/2013 | Klein et al. |
| 8,616,595 B2 | 12/2013 | Wellborn, Sr. et al. |
| 8,648,669 B1 | 2/2014 | Hathaway et al. |
| 8,690,204 B2 | 4/2014 | Lang et al. |
| 8,746,755 B2 | 6/2014 | Papanikolaou et al. |
| 8,826,596 B2 | 9/2014 | Tensing |
| 8,833,811 B2 | 9/2014 | Ishikawa |
| 8,903,605 B2 | 12/2014 | Bambenek |
| 8,915,524 B2 | 12/2014 | Charnesky |
| 8,963,701 B2 | 2/2015 | Rodriguez |
| 8,965,287 B2 | 2/2015 | Lam |
| 9,003,707 B2 | 4/2015 | Reddmann |
| 9,076,274 B2 | 7/2015 | Kamiya |
| 9,159,219 B2 | 10/2015 | Magner et al. |
| 9,184,777 B2 | 11/2015 | Esselink et al. |
| 9,187,012 B2 | 11/2015 | Sachs et al. |
| 9,189,900 B1 | 11/2015 | Penilla et al. |
| 9,260,882 B2 | 2/2016 | Krishnan et al. |
| 9,284,757 B2 | 3/2016 | Kempel |
| 9,322,204 B2 | 4/2016 | Suzuki |
| 9,353,566 B2 | 5/2016 | Miu et al. |
| 9,382,741 B2 | 7/2016 | Konchan et al. |
| 9,405,120 B2 | 8/2016 | Graf |
| 9,409,579 B2 | 8/2016 | Eichin et al. |
| 9,416,565 B2 | 8/2016 | Papanikolaou et al. |
| 9,475,369 B2 | 10/2016 | Sugiura et al. |
| 9,481,325 B1 | 11/2016 | Lange |
| 9,493,975 B1 | 11/2016 | Li |
| 9,518,408 B1 | 12/2016 | Krishnan |
| 9,522,590 B2 | 12/2016 | Fujimoto et al. |
| 9,546,502 B2 | 1/2017 | Lange |
| 9,551,166 B2 | 1/2017 | Patel et al. |
| 9,725,069 B2 | 8/2017 | Krishnan |
| 9,777,528 B2 | 10/2017 | Elie et al. |
| 9,797,178 B2 | 10/2017 | Elie et al. |
| 9,797,181 B2 | 10/2017 | Wheeler et al. |
| 9,834,964 B2 | 12/2017 | Van Wiemeersch et al. |
| 9,845,071 B1 | 12/2017 | Krishnan |
| 9,903,142 B2 | 2/2018 | Van Wiemeersch et al. |
| 9,909,344 B2 | 3/2018 | Krishnan et al. |
| 9,957,737 B2 | 5/2018 | Patel et al. |
| 2001/0005078 A1 | 6/2001 | Fukushima et al. |
| 2001/0030871 A1 | 10/2001 | Anderson |
| 2002/0000726 A1 | 1/2002 | Zintler |
| 2002/0111844 A1 | 8/2002 | Vanstory et al. |
| 2002/0121967 A1 | 9/2002 | Bowen et al. |
| 2002/0186144 A1 | 12/2002 | Meunier |
| 2003/0009855 A1 | 1/2003 | Budzynski |
| 2003/0025337 A1 | 2/2003 | Suzuki et al. |
| 2003/0038544 A1 | 2/2003 | Spurr |
| 2003/0101781 A1 | 6/2003 | Budzynski et al. |
| 2003/0107473 A1 | 6/2003 | Pang et al. |
| 2003/0111863 A1 | 6/2003 | Weyerstall et al. |
| 2003/0139155 A1 | 7/2003 | Sakai |
| 2003/0172695 A1 | 9/2003 | Buschmann |
| 2003/0182863 A1 | 10/2003 | Mejean et al. |
| 2003/0184098 A1 | 10/2003 | Aiyama |
| 2003/0216817 A1 | 11/2003 | Pudney |
| 2004/0061462 A1 | 4/2004 | Bent et al. |
| 2004/0093155 A1 * | 5/2004 | Simonds ............. B60R 16/0231 701/532 |
| 2004/0124708 A1 | 7/2004 | Giehler et al. |
| 2004/0177478 A1 * | 9/2004 | Louvel .................... E05B 81/78 16/430 |
| 2004/0195845 A1 | 10/2004 | Chevalier |
| 2004/0217601 A1 | 11/2004 | Garnault et al. |
| 2005/0057047 A1 | 3/2005 | Kachouh |
| 2005/0068712 A1 | 3/2005 | Schulz et al. |
| 2005/0216133 A1 | 9/2005 | MacDougall et al. |
| 2005/0218913 A1 | 10/2005 | Inaba |
| 2006/0056663 A1 * | 3/2006 | Call ...................... B60R 25/25 382/115 |
| 2006/0100002 A1 * | 5/2006 | Luebke ................ G06F 3/0362 455/574 |
| 2006/0186987 A1 | 8/2006 | Wilkins |
| 2007/0001467 A1 | 1/2007 | Muller et al. |
| 2007/0090654 A1 | 4/2007 | Eaton |
| 2007/0115191 A1 | 5/2007 | Hashiguchi et al. |
| 2007/0120645 A1 | 5/2007 | Nakashima |
| 2007/0126243 A1 | 6/2007 | Papanikolaou et al. |
| 2007/0132553 A1 | 6/2007 | Nakashima |
| 2007/0170727 A1 | 7/2007 | Kohlstrand et al. |
| 2008/0021619 A1 | 1/2008 | Steegmann et al. |
| 2008/0060393 A1 * | 3/2008 | Johansson ............ E05B 47/063 70/91 |

(56) References Cited

U.S. PATENT DOCUMENTS

| | | |
|---|---|---|
| 2008/0068129 A1 | 3/2008 | Ieda et al. |
| 2008/0129446 A1 | 6/2008 | Vader |
| 2008/0143139 A1 | 6/2008 | Bauer et al. |
| 2008/0202912 A1 | 8/2008 | Boddie et al. |
| 2008/0203737 A1 | 8/2008 | Tomaszewski et al. |
| 2008/0211623 A1 | 9/2008 | Scheurich |
| 2008/0217956 A1 | 9/2008 | Gschweng et al. |
| 2008/0224482 A1 | 9/2008 | Cumbo et al. |
| 2008/0230006 A1 | 9/2008 | Kirchoff et al. |
| 2008/0250718 A1 | 10/2008 | Papanikolaou et al. |
| 2008/0296927 A1 | 12/2008 | Gisler et al. |
| 2008/0303291 A1 | 12/2008 | Spurr |
| 2008/0307711 A1 | 12/2008 | Kern et al. |
| 2009/0033104 A1 | 2/2009 | Konchan et al. |
| 2009/0033477 A1 | 2/2009 | Illium et al. |
| 2009/0145181 A1 | 6/2009 | Pecoul et al. |
| 2009/0160211 A1 | 6/2009 | Kirshnan et al. |
| 2009/0177336 A1 | 7/2009 | McClellan et al. |
| 2009/0240400 A1 | 9/2009 | Lachapelle et al. |
| 2009/0257241 A1 | 10/2009 | Meinke et al. |
| 2010/0007463 A1 | 1/2010 | Dingman et al. |
| 2010/0005233 A1 | 3/2010 | Arabia et al. |
| 2010/0052337 A1 | 3/2010 | Arabia, Jr. et al. |
| 2010/0060505 A1 | 3/2010 | Witkowski |
| 2010/0097186 A1 | 4/2010 | Wielebski |
| 2010/0175945 A1 | 7/2010 | Helms |
| 2010/0235057 A1 | 9/2010 | Papanikolaou et al. |
| 2010/0235058 A1 | 9/2010 | Papanikolaou et al. |
| 2010/0235059 A1 | 9/2010 | Krishnan et al. |
| 2010/0237635 A1 | 9/2010 | Ieda et al. |
| 2010/0253535 A1 | 10/2010 | Thomas |
| 2010/0265034 A1 | 10/2010 | Cap et al. |
| 2010/0315267 A1 | 12/2010 | Chung et al. |
| 2011/0041409 A1 | 2/2011 | Newman et al. |
| 2011/0060480 A1 | 3/2011 | Mottla et al. |
| 2011/0148575 A1 | 6/2011 | Sobecki et al. |
| 2011/0154740 A1 | 6/2011 | Matsumoto et al. |
| 2011/0180350 A1 | 7/2011 | Thacker |
| 2011/0203181 A1 | 8/2011 | Magner et al. |
| 2011/0203336 A1 | 8/2011 | Mette et al. |
| 2011/0227351 A1 | 9/2011 | Grosedemouge |
| 2011/0248862 A1 | 10/2011 | Budampati |
| 2011/0252845 A1 | 10/2011 | Webb et al. |
| 2011/0254292 A1 | 10/2011 | Ishii |
| 2011/0313937 A1 | 12/2011 | Moore, Jr. et al. |
| 2012/0119524 A1 | 5/2012 | Bingle et al. |
| 2012/0154292 A1 | 6/2012 | Zhao et al. |
| 2012/0180394 A1 | 7/2012 | Shinohara |
| 2012/0205925 A1 | 8/2012 | Muller et al. |
| 2012/0228886 A1 | 9/2012 | Muller et al. |
| 2012/0252402 A1 | 10/2012 | Jung |
| 2013/0049403 A1 | 2/2013 | Fannon et al. |
| 2013/0069761 A1 | 3/2013 | Tieman |
| 2013/0079984 A1 | 3/2013 | Aerts et al. |
| 2013/0104459 A1 | 5/2013 | Patel et al. |
| 2013/0127180 A1 | 5/2013 | Heberer et al. |
| 2013/0138303 A1 | 5/2013 | McKee et al. |
| 2013/0207794 A1 | 8/2013 | Patel |
| 2013/0282226 A1 | 10/2013 | Pollmann |
| 2013/0295913 A1 | 11/2013 | Matthews, III et al. |
| 2013/0311046 A1 | 11/2013 | Heberer et al. |
| 2013/0321065 A1 | 12/2013 | Salter et al. |
| 2013/0325521 A1 | 12/2013 | Jameel |
| 2014/0000165 A1 | 1/2014 | Patel et al. |
| 2014/0007404 A1 | 1/2014 | Krishnan et al. |
| 2014/0015637 A1 | 1/2014 | Dassanakake et al. |
| 2014/0088825 A1 | 3/2014 | Lange et al. |
| 2014/0129113 A1 | 5/2014 | Van Wiemeersch et al. |
| 2014/0150581 A1 | 6/2014 | Scheuring et al. |
| 2014/0156111 A1 | 6/2014 | Ehrman |
| 2014/0188999 A1 | 7/2014 | Leonard et al. |
| 2014/0200774 A1 | 7/2014 | Lange et al. |
| 2014/0227980 A1 | 8/2014 | Esselink et al. |
| 2014/0242971 A1 | 8/2014 | Aladenize et al. |
| 2014/0245666 A1 | 9/2014 | Ishida et al. |
| 2014/0256304 A1 | 9/2014 | Frye et al. |
| 2014/0278599 A1 | 9/2014 | Reh |
| 2014/0293753 A1 | 10/2014 | Pearson |
| 2014/0338409 A1 | 11/2014 | Kraus et al. |
| 2014/0347163 A1 | 11/2014 | Banter et al. |
| 2015/0001926 A1 | 1/2015 | Kageyama et al. |
| 2015/0048927 A1 | 2/2015 | Simmons |
| 2015/0059250 A1 | 3/2015 | Miu et al. |
| 2015/0084739 A1 | 3/2015 | Lemoult et al. |
| 2015/0149042 A1 | 5/2015 | Cooper et al. |
| 2015/0161832 A1 | 6/2015 | Esselink et al. |
| 2015/0197205 A1 | 7/2015 | Xiong |
| 2015/0240548 A1 | 8/2015 | Bendel et al. |
| 2015/0294518 A1 | 10/2015 | Peplin |
| 2015/0330112 A1 | 11/2015 | Van Wiemeersch et al. |
| 2015/0330113 A1 | 11/2015 | Van Wiemeersch et al. |
| 2015/0330114 A1 | 11/2015 | Linden et al. |
| 2015/0330117 A1 | 11/2015 | Van Wiemeersch et al. |
| 2015/0330133 A1 | 11/2015 | Konchan et al. |
| 2015/0360545 A1 | 12/2015 | Nanla |
| 2015/0371031 A1 | 12/2015 | Ueno et al. |
| 2016/0060909 A1 | 3/2016 | Krishnan et al. |
| 2016/0130843 A1 | 5/2016 | Bingle |
| 2016/0138306 A1 | 5/2016 | Krishnan et al. |
| 2016/0153216 A1* | 6/2016 | Funahashi ............... E05B 81/80 292/2 |
| 2016/0273255 A1 | 9/2016 | Suzuki et al. |
| 2016/0326779 A1 | 11/2016 | Papanikolaou et al. |
| 2017/0014039 A1 | 1/2017 | Pahlevan et al. |
| 2017/0022742 A1 | 1/2017 | Seki et al. |
| 2017/0058588 A1 | 3/2017 | Wheeler et al. |
| 2017/0074006 A1 | 3/2017 | Patel et al. |
| 2017/0247016 A1 | 8/2017 | Krishnan |
| 2017/0270490 A1 | 9/2017 | Penilla et al. |
| 2017/0306662 A1 | 10/2017 | Och et al. |
| 2017/0349146 A1 | 12/2017 | Krishnan |
| 2018/0038147 A1 | 2/2018 | Linden et al. |
| 2018/0051493 A1 | 2/2018 | Krishnan et al. |
| 2018/0051498 A1 | 2/2018 | Van Wiemeersch et al. |
| 2018/0058128 A1 | 3/2018 | Khan et al. |
| 2018/0065598 A1 | 3/2018 | Krishnan |
| 2018/0080270 A1 | 3/2018 | Khan et al. |
| 2018/0128022 A1 | 5/2018 | Van Wiemeersh et al. |

FOREIGN PATENT DOCUMENTS

| | | |
|---|---|---|
| CN | 201198681 Y | 2/2009 |
| CN | 201280857 Y | 7/2009 |
| CN | 101527061 A | 9/2009 |
| CN | 101666192 A | 3/2010 |
| CN | 201567872 U | 9/2010 |
| CN | 101932466 A | 12/2010 |
| CN | 201915717 U | 8/2011 |
| CN | 202200933 U | 4/2012 |
| CN | 102862549 A | 1/2013 |
| CN | 202686247 U | 1/2013 |
| CN | 103206117 A | 7/2013 |
| CN | 103264667 A | 8/2013 |
| CN | 203511548 U | 4/2014 |
| CN | 204326814 U | 5/2015 |
| DE | 4403655 A1 | 8/1995 |
| DE | 19620059 A1 | 11/1997 |
| DE | 19642698 A1 | 4/1998 |
| DE | 19642698 A2 | 11/2000 |
| DE | 10212794 A1 | 6/2003 |
| DE | 20121915 U1 | 11/2003 |
| DE | 10309821 A1 | 9/2004 |
| DE | 102005041551 A1 | 3/2007 |
| DE | 102006029774 A1 | 1/2008 |
| DE | 102006040211 A1 | 3/2008 |
| DE | 102006041928 A1 | 3/2008 |
| DE | 102010052582 A1 | 5/2012 |
| DE | 102011051165 A1 | 12/2012 |
| DE | 102015101164 A1 | 7/2015 |
| DE | 102014107809 A1 | 12/2015 |
| EP | 0372791 A2 | 6/1990 |
| EP | 0694664 A1 | 1/1996 |
| EP | 1162332 A1 | 12/2001 |
| EP | 1284334 A1 | 2/2003 |

(56) References Cited

FOREIGN PATENT DOCUMENTS

| | | |
|---|---|---|
| EP | 1288403 A2 | 3/2003 |
| EP | 1284334 A1 | 9/2003 |
| EP | 1460204 A2 | 9/2004 |
| EP | 1465119 A1 | 10/2004 |
| EP | 1338731 A2 | 2/2005 |
| EP | 1944436 A2 | 7/2008 |
| EP | 2314803 A2 | 4/2011 |
| FR | 2698838 A1 | 6/1994 |
| FR | 2783547 A1 | 3/2000 |
| FR | 2841285 A1 | 12/2003 |
| FR | 2860261 A1 | 4/2005 |
| FR | 2948402 A1 | 7/2009 |
| FR | 2955604 A1 | 7/2011 |
| GB | 2402840 A | 12/2004 |
| GB | 2496754 A | 5/2013 |
| JP | 62255256 A | 11/1987 |
| JP | 05059855 A | 3/1993 |
| JP | 406167156 A | 6/1994 |
| JP | 406185250 A | 7/1994 |
| JP | 2000064685 A | 2/2000 |
| JP | 2000314258 A | 11/2000 |
| JP | 2007100342 A | 4/2007 |
| JP | 2007138500 A | 6/2007 |
| KR | 20030025738 A | 3/2003 |
| KR | 20120108580 A | 10/2012 |
| WO | 0123695 A1 | 4/2001 |
| WO | 2013111615 A1 | 8/2013 |
| WO | 2013146918 A1 | 10/2013 |
| WO | 2014146186 A1 | 9/2014 |
| WO | 2015064001 A1 | 5/2015 |
| WO | 2015145868 A1 | 10/2015 |
| WO | 2017160787 A2 | 9/2017 |

OTHER PUBLICATIONS

General Motors Corporation, 2006 Chevrolet Corvette Owner Manual, © 2005 General Motors Corporation, 4 pages.

General Motors LLC, 2013 Chevrolet Corvette Owner Manual, 2012, 17 pages.

General Motors, "Getting to Know Your 2014 Corvette," Quick Reference Guide, 2013, 16 pages.

InterRegs Ltd., Federal Motor Vehicle Safety Standard, "Door Locks and Door Retention Components," 2012, F.R. vol. 36 No. 232—Feb. 12, 1971, 23 pages.

Ross Downing, "How to Enter & Exit a Corvette With a Dead Battery," YouTube video http://www.youtube.com/watch?v=DLDqmGQU6L0, Jun. 6, 2011, 1 page.

Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat/, May 14, 2011, 1 page.

Don Roy, "ZR1 Owner Calls 911 After Locking Self in Car," website http://www.corvetteonline.com/news/zr1-owner-calls-911-after-locking-self-in-car/, Apr. 13, 2011, 2 pages.

Zach Bowman, "Corvette with dead battery traps would-be thief," website http://www.autoblog.com/2011/10/25/corvette-with-dead-battery-traps-would-be-thief/, Oct. 25, 2011, 2 pages.

U.S. Appl. No. 14/468,634, filed Aug. 26, 2014, 15 pages.

U.S. Appl. No. 13/608,303, filed Sep. 10, 2012, 15 pages.

U.S. Appl. No. 14/281,998, filed May 20, 2014, 20 pages.

U.S. Appl. No. 14/282,224, filed May 20, 2014, 15 pages.

U.S. Appl. No. 14/276,415, filed May 13, 2014, 18 pages.

Office Action dated Mar. 10, 2017, U.S. Appl. No. 15/174,206, filed Jun. 6, 2016, 17 pages.

Hyundai Bluelink, "Send Directions to your car," Link to App, 2015, 3 pages.

Bryan Laviolette, "GM's New App Turns Smartphones into Virtual Keys," Article, Jul. 22, 2010, 2 pages.

China National Intellectual Property Administration Office Action, Application No. 201510531838.8, dated Oct. 23, 2018 (16 pages).

Zipcar.com, "Car Sharing from Zipcar: How Does car Sharing Work?" Feb. 9, 2016, 6 pages.

Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.html#VI_C, 23 pages, Aug. 28, 2010.

"Push Button to open your car door" Online video clip. YouTube, Mar. 10, 2010. 1 page.

Car of the Week: 1947 Lincoln convertible by: bearnest May 29, 2012 http://www.oldcarsweekly.com/car-of-the-week/car-of-the-week-1947-lincoln-convertible. 7 pages.

U.S. Appl. No. 14/276,415, Office Action dated Mar. 28, 2018, 19 pages.

U.S. Appl. No. 12/402,744, Office Action dated Oct. 23, 2013, 7 pages.

U.S. Appl. No. 12/402,744, Advisory Action dated Jan. 31, 2014, 2 pages.

U.S. Appl. No. 14/280,035, filed May 16, 2014, entitled "Powered Latch System for Vehicle Doors and Control System Therefor."

U.S. Appl. No. 14/281,998, filed May 20, 2014, entitled "Vehicle Door Handle and Powered Latch System."

U.S. Appl. No. 14/282,224, filed May 20, 2014, entitled "Powered Vehicle Door Latch and Exterior Handle With Sensor."

George Kennedy, "Keyfree app replaces conventional keys with your smart phone," website, Jan. 5, 2015, 2 pages.

Hyundai Motor India Limited, "Hyundai Care," website, Dec. 8, 2015, 3 pages.

Keyfree Technologies Inc., "Keyfree," website, Jan. 10, 2014, 2 pages.

Prweb, "Keyfree Technologies Inc. Launches the First Digital Car Key," Jan. 9, 2014, 3 pages.

* cited by examiner

KEYLESS VEHICLE DOOR LATCH SYSTEM WITH POWERED BACKUP UNLOCK FEATURE

CROSS REFERENCE TO RELATED APPLICATION

This application is a continuation of U.S. patent application Ser. No. 14/468,634, filed Aug. 26, 2014, and entitled "KEYLESS VEHICLE DOOR LATCH SYSTEM WITH POWERED BACKUP UNLOCK FEATURE," now U.S. Pat. No. 9,909,344, issued on Mar. 6, 2018, the entire disclosure of which is incorporated herein by reference.

FIELD OF THE INVENTION

The present invention generally relates to door locks for motor vehicles, and more particularly to a powered door lock having a backup powered unlock feature that eliminates the need for an exterior lock cylinder and key.

BACKGROUND OF THE INVENTION

Driver's doors of motor vehicles typically include a door latch that selectively retains the door in a closed position. The latch may include a door lock system that includes a lock cylinder that is accessible from the exterior of the vehicle door. The door may also include a powered door lock that can be actuated utilizing an interior switch or a remote wireless fob. If the wireless remote fob malfunctions, a user can typically still gain access by inserting a key into the lock cylinder to mechanically unlock the driver's door lock. However, the use of mechanical lock cylinders, keys, and linkages tends to add to the complexity and cost of the vehicle.

SUMMARY OF THE INVENTION

One aspect of the present invention is a keyless door latch system for doors of motor vehicles that does not require a lock cylinder and key. The keyless door latch system includes a door latch and a powered lock configured to be operably connected to a first electrical power supply. The powered lock defines locked and unlocked conditions whereby the latch is released upon movement of an exterior door handle when the powered lock is unlocked, and wherein the latch does not release upon movement of an exterior door handle when the powered lock is locked. The system includes a first electrical power supply and an electronic controller that is operably connected to the powered lock. The system further includes a backup device including a second electrical power supply configured to be operably connected to the powered lock. A user input device is configured to communicate with the electronic controller and/or with the backup device. The user input device may include first and second user input features. The system is configured to cause the electronic controller to unlock the powered lock utilizing electrical power from the first electrical power supply if a user actuates the first user input feature. The system is configured to cause the backup device to unlock the powered lock utilizing electrical power from the second electrical power supply if a user actuates the second user input feature. The user input device may comprise a wireless communication device that transmits wireless signals to the electronic controller and/or to the backup device. The electronic controller and the backup device may include receivers that are configured to receive wireless signals from the user input device. The user input device may include first and second power sources such as first and second electrical batteries whereby the second battery can be utilized to generate a wireless signal to the backup device in the event the first battery fails.

Another aspect of the present invention is a powered door latch including a latch having an electrically powered lock. The powered door latch also includes first and second electrical power supplies and a wireless remote device such as a fob having first and second user inputs. When the first and second user inputs are actuated, electrical power is supplied to the lock from the first and second electrical power supplies, respectively, whereby the latch can be unlocked utilizing power from the second electrical power supply even if the first electrical power supply fails. The wireless remote fob may be configured to generate a first wireless signal upon actuation of the first user input. The powered door latch may also include a first receiver configured to receive the first wireless signal, and wherein the first receiver is configured to cause the first electrical power supply to supply electrical power to the electrically powered lock such that the electrically powered lock is unlocked. The wireless remote fob may be configured to generate a second wireless signal upon actuation of the second user input. The powered door latch may also include a second receiver configured to receive the second wireless signal, and wherein the second receiver is configured to cause the second electrical power supply to supply electrical power to the electrically powered lock such that the electrically powered lock is unlocked.

Another aspect of the present invention is a keyless door latch system for doors of motor vehicles including a door latch and a powered lock that selectively prevents unlatching of the door latch when the powered lock is in a locked state. The door latch system also includes first and second electrical power supplies, and a user input device having first and second user input features. The door latch system is configured to supply electrical power from the first electrical power supply to the powered lock to unlock the powered lock upon actuation of the first user input feature. The system is also configured to supply electrical power from the second electrical power supply to unlock the powered lock upon actuation of the second user input feature. The user input device may comprise a wireless portable device that is configured to generate a first wireless signal upon actuation of the first user input feature, and to generate a second wireless signal upon actuation of the second user input feature. The door latch system may include first and second receivers that are operably connected to the first and second electrical power supplies, respectively. The first and second receivers may be configured to receive the first and second wireless signals, respectively, to unlock the powered lock.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
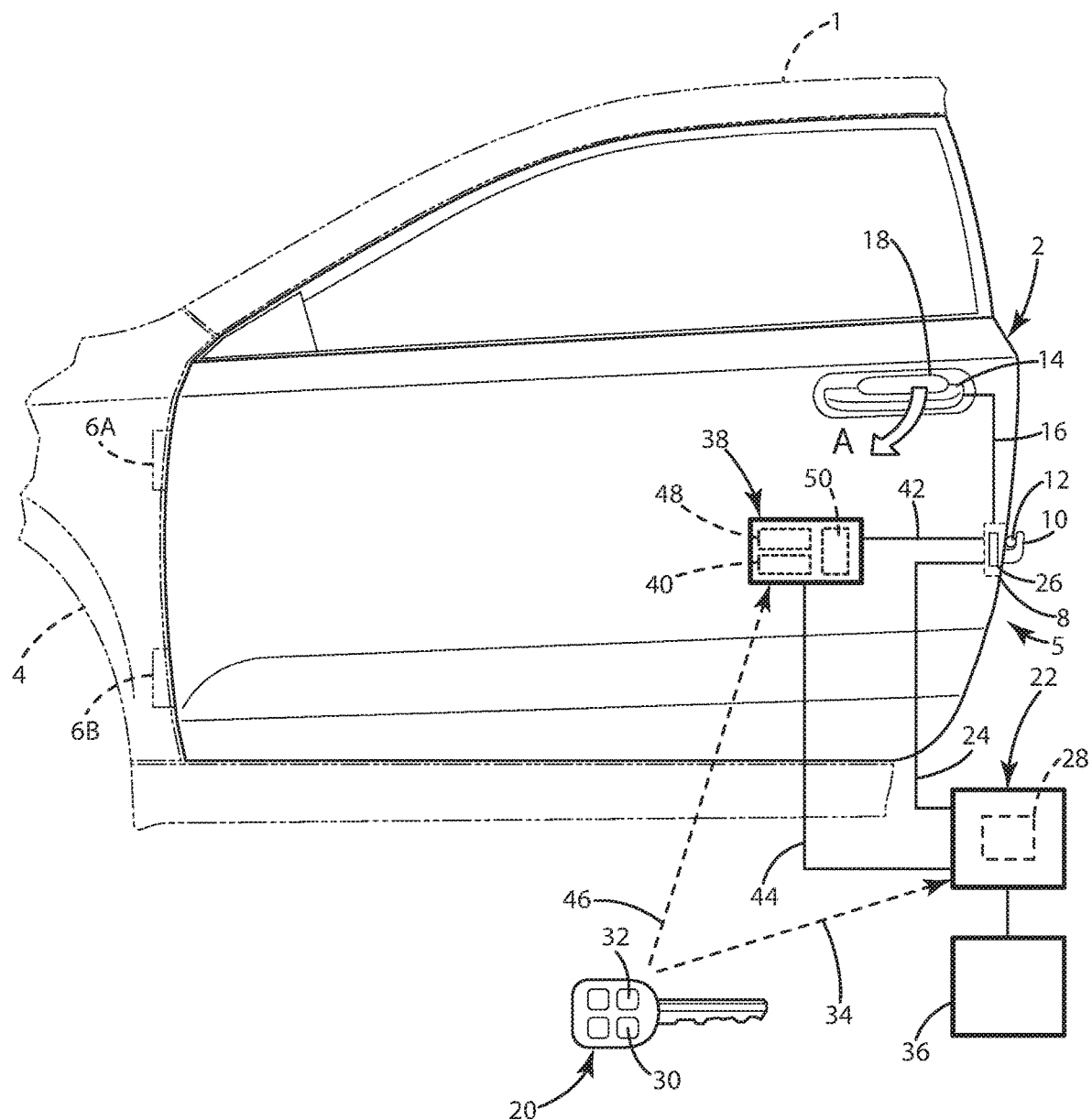
FIG. 1 is a partially schematic side elevational view of a vehicle door including a latch and powered lock system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a driver's side door 2 that does not have a lock cylinder of the type that receives a key to mechanically unlock the door 2. Door 2 is movably mounted to a vehicle structure 4 by hinges 6A and 6B. A latch 8 includes a movable latch member 10 that selectively engages a striker 12 to retain the door 2 in a closed position, and a lock 26. The latch 8 may be operably connected to a movable exterior door handle 14 by mechanical linkage 16. The linkage 16 may comprise elongated link members, a cable, or other suitable mechanical connection. If the lock 26 of door 2 is in an unlocked state, a user can move the handle 14 as indicated by the arrow "A" to thereby cause the latch 8 to unlatch, permitting the door 2 to be opened. Specifically, latch 8 may include a pawl (not shown) of a known configuration that selectively retains the latch member 10 in a latched position. When the latch 8 of door 2 is unlocked, movement of the handle 14 causes the pawl to shift to a released position, thereby allowing movement of latch member 10 whereby the latch member 10 disengages from striker 12 as door 2 is pulled open. However, if the lock 26 of latch 8 is in a locked state, movement of the handle 14 does not release the pawl, such that the movable latch member 10 remains in an engaged position relative to striker 12, thereby preventing opening of the door 2. The basic operation of latch 8 as just described is well known to those skilled in the art, such that a more detailed description concerning the operation of the pawl, latch member 10, and striker 12 is not believed to be required.

The keyless latch system of the present invention further includes a control module 22 that is operably connected to the latch 8 by a conductive line 24 or the like. Lock 26 may comprise an electrically powered lock that is operably connected to the control module 22. The powered lock 26 is operably connected to a main vehicle power supply such as a battery 36 by control module 22 if receiver 28 of module 22 receives a wireless signal 34 from a fob or wireless user input device 20. A first input feature such as a push button 30 on keyfob 20 may be pushed by a user to generate wireless signal 34 that is received by receiver 28 of control module 22, and the control module 22 then causes powered lock 26 to receive power from battery 36 to unlock the latch 8. Remotely actuated powered door locks are known, such that a detailed description of this aspect of the latch system is not believed to be required.

In contrast to conventional driver's doors, driver's door 2 does not include a lock cylinder that receives a key to mechanically unlock latch 8 in the event the user does not have a remote fob or if the remote fob fails. Rather, the driver's door 2 includes a backup module 38 having a second receiver 40 that is configured to receive a second wireless signal 46 that is generated by the keyfob 20 upon actuation of second input 32. The backup module 38 includes a controller or circuit arrangement 50 that causes electrical power from a backup power supply 48 to be supplied to powered lock 26 through an electrical line 42 when second wireless signal 46 is received by second receiver 40. The backup power supply 48 may comprise a battery, capacitor, or other suitable power supply. As discussed in more detail below, backup power supply 48 provides for unlocking of powered lock 26 even if main power supply 36 fails. Furthermore, as discussed in more detail below, the backup power supply 48 may be operably connected to control module 22 and/or main vehicle battery 36 to recharge backup power supply 48 if required.

Figure 2:
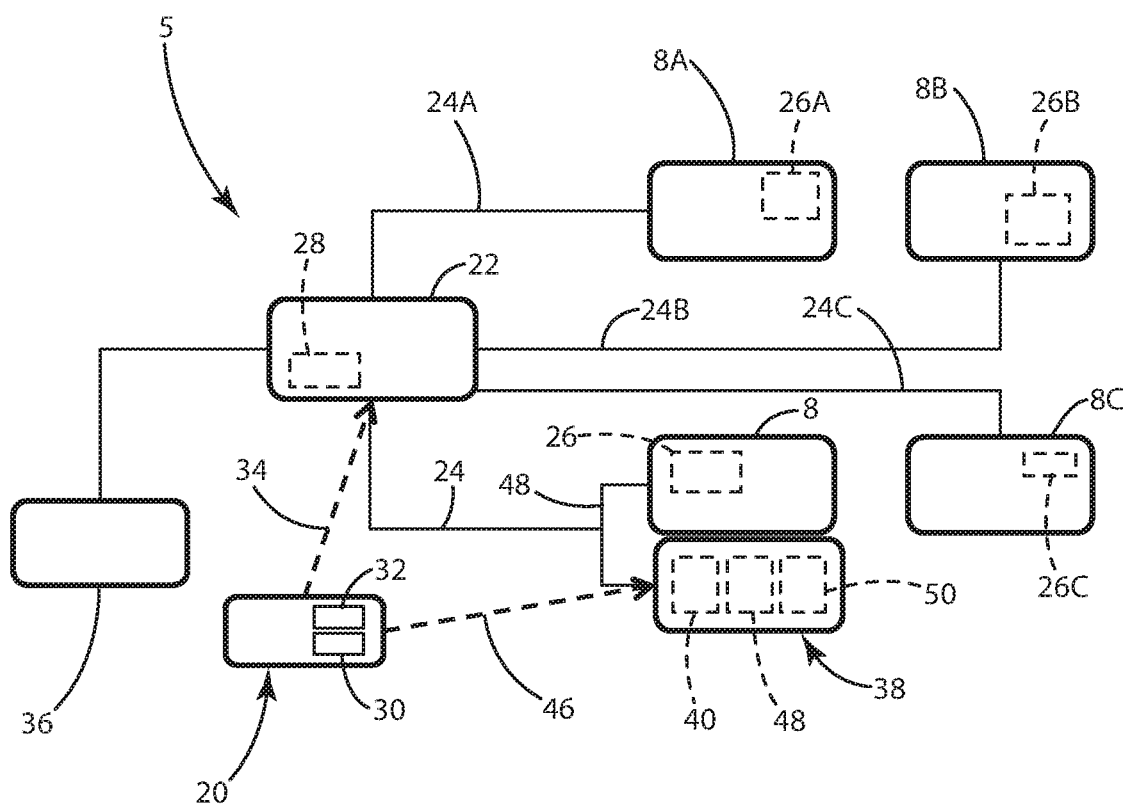
FIG. 2 is a schematic drawing of a latch and powered lock system according to one aspect of the present invention.

With further reference to FIG. 2, control module 22 may also be connected to right hand front latch 8A by a line 24A. Similarly, the control module 22 may be connected to a right rear latch 8B by a line 24B, and a left rear latch 8C by a line 24C. One or more interior switches (not shown) may be operably connected to the control module 22 whereby occupants of the vehicle can actuate the switches, thereby causing the control module 22 to supply power from battery 36 to the powered locks 26, 26A, 26B, and 26C of door latches 8, 8A, 8B, and 8C, respectively, in a manner.

As discussed above, the user input device 20 may include first and second input features 30 and 32. The input features 30 and 32 may comprise push buttons or other suitable features. For example, the remote device 20 may comprise a portable device (e.g. "smart phone") having a touch screen that displays icons forming the first and second input features 30 and 32. Alternatively, the first and second input features 30 and 32 may comprise push buttons as noted above. Thus, the user input device 20 may comprise a portable keyfob, or it may comprise a mobile phone or other suitable device.

As discussed in more detail below in connection with FIG. 8, keyfob 20 may include a first battery 62 and a second battery 64. The first battery 62 may be configured to supply electrical power when first input 30 is actuated to thereby generate a first wireless signal 34. The second battery 64 may comprise a backup battery that generates a second wireless signal 46 upon actuation of second input 32. Thus, the keyfob 20 has redundancy with respect to the power supply and inputs utilized to generate the wireless signals 34 and 46. The second battery 64, second input 32, backup power supply 48, second receiver 40, and other related components define a backup system that can be utilized to unlock powered lock 26 in the event a component or a combination of components in the primary system (first input 30, first battery 62, first receiver 28, controller 22, and battery 36) fail. This redundancy significantly reduces the chances that both the primary unlock system and the backup unlock system both fail simultaneously such that a user cannot gain access to the interior of vehicle 1. In general, the probabilities can be expressed as follows:

Pb=Probability of Battery 36 failing
Pf=Probability of Key Fob 20 failing
Pem=Probability of Electronic Module 32 failing
Pal=Probability that all latches 8-8C fail at same time
Pal=Probability of all latches 8-8C failing at same time (latches 8-8C are in parallel and their failure is independent)

$$Pal=1-((1-Pflh)*(1-Pfrh)*(1-Prlh)*(1-Prrh))$$

Pcs=Probability backup system fails (backup power supply 48, backup module 38, keyfob 20) (system in series—failure occurs even if only one of the events occurs)
Pflh=Probability of Front LH latch 8 failing
Probability of latches for all doors failing simultaneously from outside electronically=Pel
Pel=Pb*Pf*Pem*Pal (system in series—failure occurs even if only one of the events occurs)
Pbk=Probability of backup system failing
Pbk=Pcs*Pflh
  (system in series—failure occurs even if only one of the events occurs)
Popendoor=Probability of not being able to open any door from outside
Popendoor=1−(1−Pel)*(1−Pcs) (The primary and backup unlock systems and the backup systems are in parallel)

Accordingly, the probability of not being able to open at least one door from the outside of the vehicle is very low, provided that the individual components of the system do not have a high failure rate.

Figure 3:
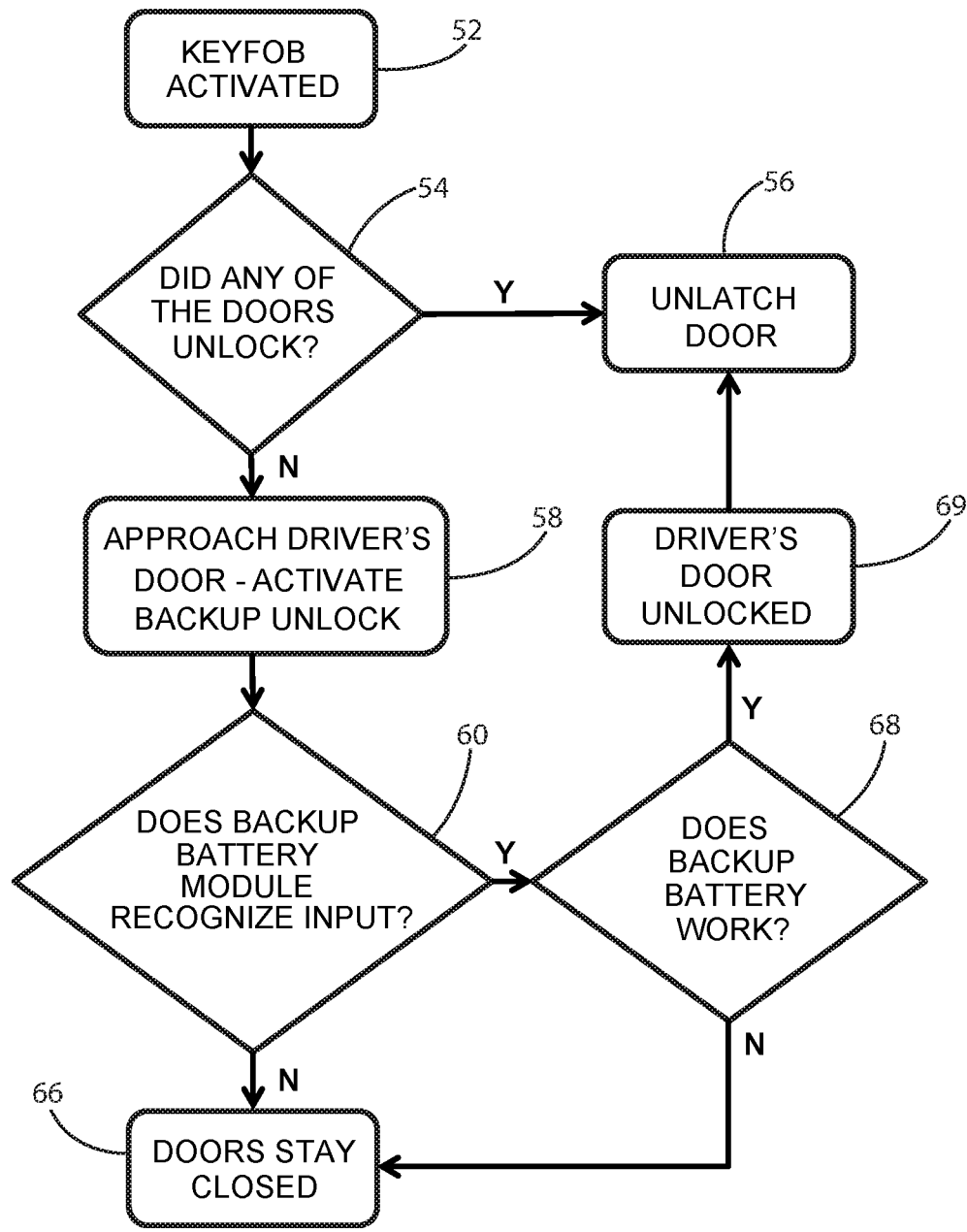
FIG. 3 is a flow chart showing operation of a door latch and powered lock according to one aspect of the present invention.

With further reference to FIG. 3, during operation the keyfob 20 may be actuated as indicated by the step 52. In step 52, the first input feature 30 (FIGS. 1 and 2) may be actuated to generate a first wireless signal 34 to the control module 22. At step 54, control module 22 determines if any of the locks 26-26C of latches 8-8C of the doors of the vehicle unlocked. If any of the doors did unlock, a user moves handle 14 and unlatches the door at step 56. If none of the doors unlock, a user then actuates the second input 32 to activate the backup module 38 as shown at step 58. The second battery 64 of keyfob 20 may comprise a lower power battery, such that second wireless signal 46 has lower power than the first wireless signal 34. Accordingly, at step 58 a user may need to approach the driver's door 2 in order to ensure that second wireless signal 46 has sufficient strength to be received by second receiver 40, thereby causing the backup module 38 to actuate (unlock) powered lock 26.

Referring again to FIG. 3, backup module 38 determines if second wireless signal 46 is recognized. In general, first and second wireless signals 34 and 46 may comprise a security code that must be recognized by control module 22 and backup module 38, respectively, in order for the control module 22 and backup module 38 to unlock the powered lock 26. If the backup module 38 does not recognize the second signal 46, the powered lock 26 remains locked as shown at step 66. If the second wireless signal 46 is recognized by the backup module 38 at step 60, and if the backup power supply 48 has sufficient power (step 68), the backup module 38 supplies power from backup power supply 48 to the powered lock 26 to thereby unlock the driver's door at step 69, thereby allowing a user to unlatch the door at step 56 by grasping and pulling on handle 14.

Figure 4:
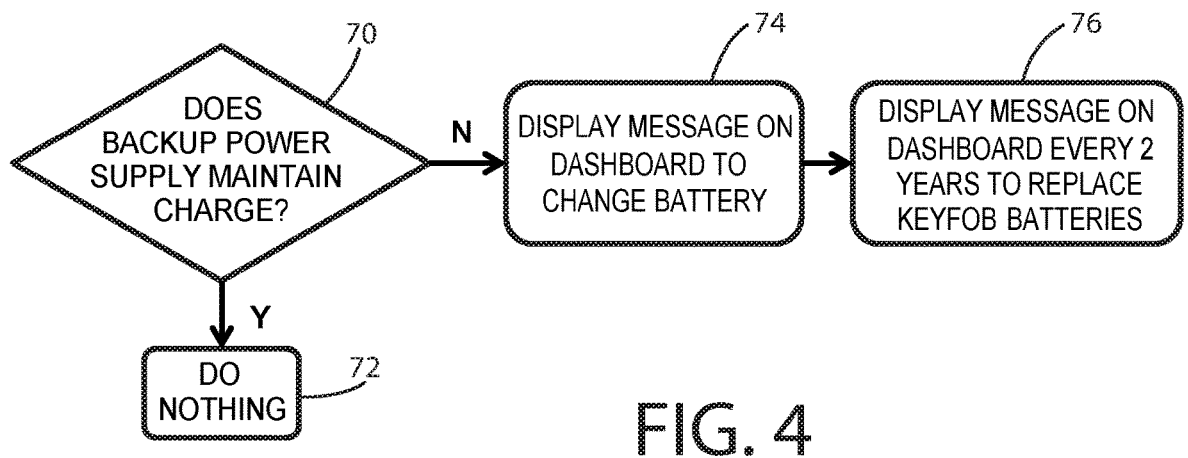
FIG. 4 is a flow chart showing battery recharge of the door lock system according to another aspect of the present invention.

With further reference to FIG. 4, the latch system 5 may be configured to recharge the backup power supply 48 if required. The control module 22 and/or backup module 38 may be configured to monitor the rechargeable backup power supply 48 as shown at step 70 of FIG. 4. If the backup power supply 48 does maintain a proper charge according to predefined criteria, the control module 22 and/or backup module 38 do not take any action as shown at step 72. In the event the backup power supply 48 does not maintain a proper charge at step 70, control module 22 and/or backup module 38 cause a message to be displayed on the vehicle dashboard indicating that the battery or backup power supply 48 must be changed/serviced as shown at step 74. As shown at step 76, the control module 22 and/or backup module 38 may also be configured to display a message on the dashboard every two years to replace the batteries 62 and/or 64 of keyfob 20. It will be understood that the message of step 74 could comprise an audible tone, written message, or the like. Furthermore, the message or signal could indicate that the backup power supply 48 needs to be serviced or repaired. It will be understood that the alert or display of step 76 could comprise various alerts other than a message to replace the keyfob batteries, and the message could be displayed at any suitable time frame.

Figure 5:
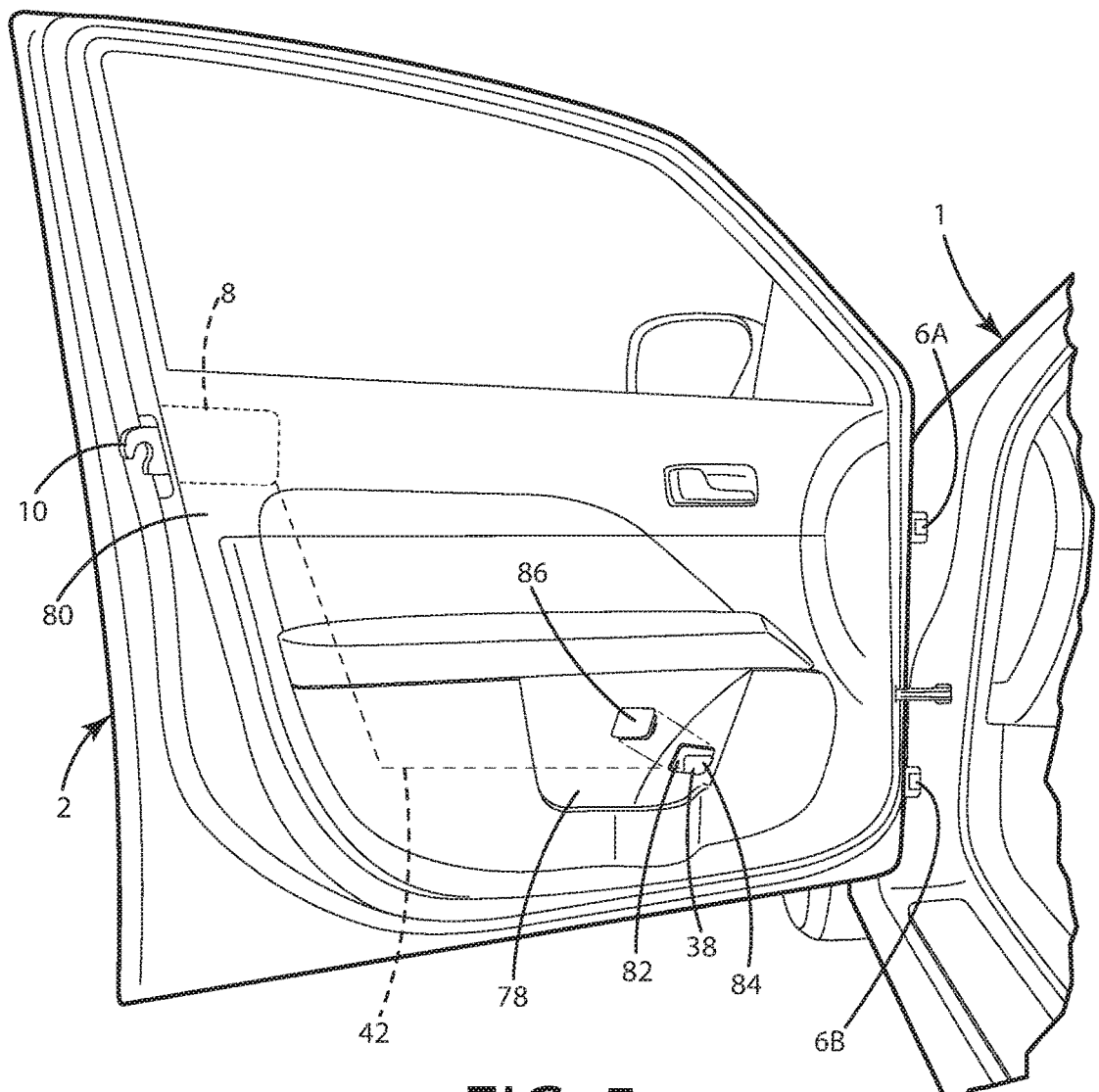
FIG. 5 is a partially fragmentary perspective view showing an interior of a vehicle door.

With further reference to FIG. 5, vehicle door 2 may include a map pocket 78 on an inner side 80 of door 2. The backup module 38 may be mounted in a cavity 82 that is accessible through an opening 84 in map pocket 78. A cover 86 may be removably attached to the door 2 to selectively close off opening 84. The opening 84 provides access to the backup module 38 to permit servicing and/or replacement of backup module 38, and to permit replacement of backup power supply 48 of backup module 38 as may be required. It will be understood that the arrangement of FIG. 5 is merely an example of a suitable location and mounting arrangement for the backup module 38. Alternatively, the backup module 38 may be mounted in an interior space of door 2 adjacent the exterior handle 14 (FIG. 1), whereby the backup module 38 is accessible by removing an exterior bezel 18 (FIG. 1).

Figure 6:
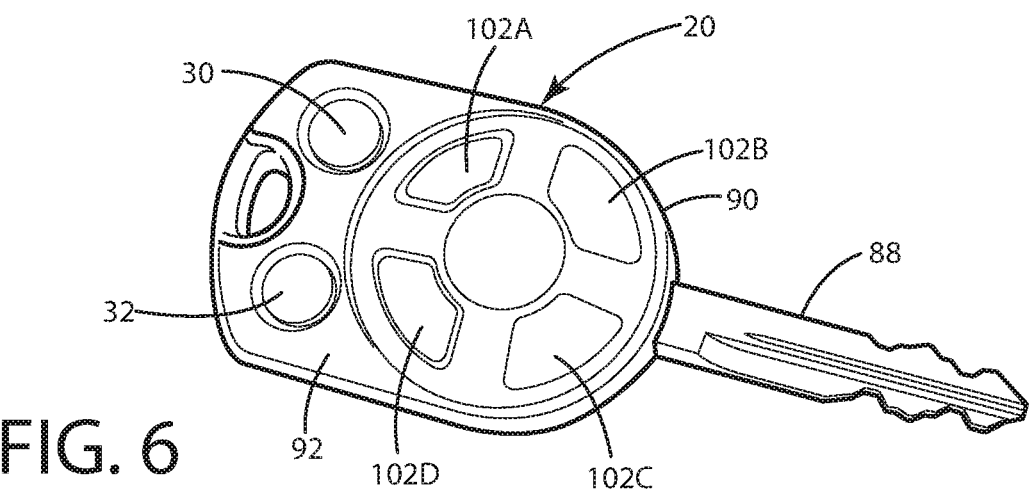
FIG. 6 is a perspective view showing a top side of a remote wireless fob according to one aspect of the present invention.
Figure 7:
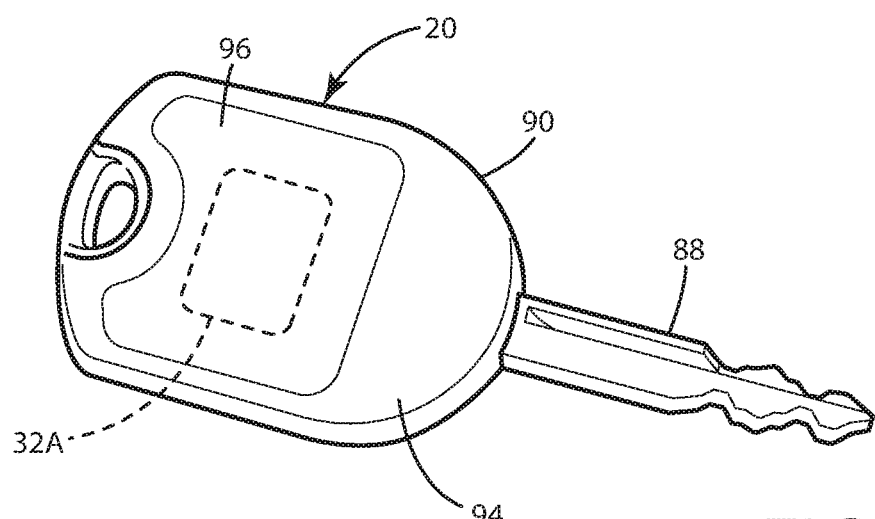
FIG. 7 is a perspective bottom view of the remote wireless fob of FIG. 6.
Figure 8:
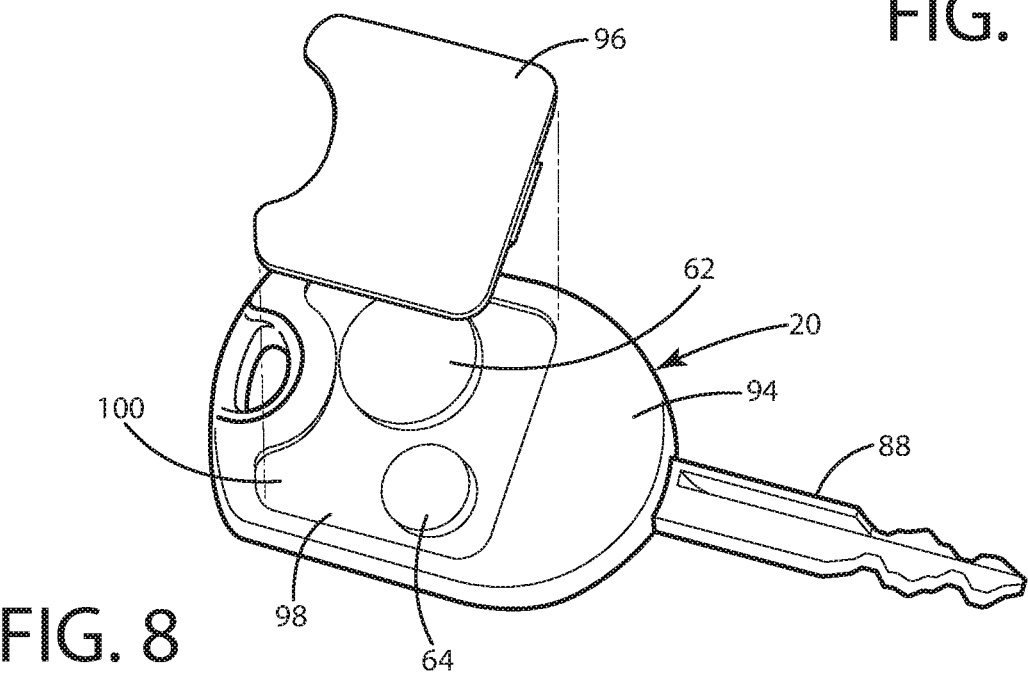
FIG. 8 is an exploded isometric view of the fob of FIG. 7 showing a cover in a removed configuration.

With further reference to FIGS. 6-8, keyfob 20 may include an ignition key 88. However, the ignition key 88 is optional, and the keyfob 20 could comprise a fob that does not include a key 88. In the illustrated example, the keyfob 20 includes a housing 90 having a front side 92 and a rear side 94. The first and second input features may comprise a first push button 30 and a second push button 32, respectively. A removable cover 96 selectively closes off an opening 98 and permits access to interior space 100 whereby first and second batteries 62 and 64 can be replaced. The keyfob 20 may include additional input features such as buttons 102A-102D that provide for control of the vehicle alarm and other such features. The first and second inputs (pushbuttons 30 and 32) may be positioned on the front side 92 of the keyfob 20. The pushbuttons 30 and 32 may have substantially the same size and configuration. However, the second input 32 may comprise a pushbutton or the like 32A (FIG. 7) having a substantially different configuration/appearance than the first input 30 (FIG. 6). In this way, the second input 32/32A may have a unique appearance/configuration whereby a user can readily distinguish between the two user inputs.

Significantly, the backup module 38 and backup transmitting features of keyfob 20 can be utilized instead of a conventional door lock cylinder, thereby eliminating the cost and complexity associated with conventional door lock cylinders and keys. Conventional door lock cylinders may take up significant space within vehicle doors, and the lock cylinder and associated linkage may need to be specifically designed for a particular vehicle door. In contrast, the backup module 38 may comprise a compact unit that can be mounted at numerous locations within the vehicle door 2. Specifically, because the backup module 38 can be operably connected to the latch 8 by an electrical line 42, specific mechanical linkage for a lock cylinder is not required in the latch system 5 of the present invention.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A keyless door latch system for doors of motor vehicles, the keyless door latch system comprising:
   a door latch including a powered lock defining locked and unlocked conditions whereby the latch does not release when the powered lock is locked;
   a first electrical power supply;
   an electronic controller operably connected to the powered lock;
   a backup device including a second electrical power supply configured to be operably connected to the powered lock;
   a user input device configured to communicate with the electronic controller and with the backup device, the user input device including first and second user input features, and wherein the door latch system is configured to cause the electronic controller to unlock the powered lock utilizing electrical power from the first electrical power supply if a user actuates the first user input feature, and wherein the door latch system is configured to cause the backup device to unlock the powered lock utilizing electrical power from the second electrical power supply if a user actuates the second user input feature, whereby a lock cylinder is not required to unlock the door latch in the event the door latch cannot be unlocked utilizing power from the first electrical power supply.

2. The keyless door latch system of claim 1, including:
   a movable exterior door handle that is mechanically connected to the latch such that movement of the exterior door handle unlatches the latch if the powered lock is unlocked.

3. The keyless door latch system of claim 1, wherein:
   the user input device comprises a wireless communication device that transmits wireless signals to the electronic controller and to the backup device.

4. The keyless door latch system of claim 1, wherein:
   the user input device comprises a portable hand held transmitter that transmits wireless signals to the electronic controller and to the backup device.

5. The keyless door latch system of claim 4, wherein:
   the first user input feature comprises a first switch, and the second user input feature comprises a second switch.

6. The keyless door latch system of claim 5, wherein:
   the user input device includes first and second portable electrical power supplies, and wherein the second portable electrical power supply is configured to provide power to enable transmitting a wireless signal to the backup device to unlock the powered lock upon actuation of the second switch even if the first portable electrical power supply fails.

7. The keyless door latch system of claim 1, wherein:
   the first electrical power supply comprises a battery that is configured to be operably connected to an electrical system of a motor vehicle;
   the second electrical power supply comprises at least one of a capacitor and a rechargeable battery.

8. The keyless door latch system of claim 1, wherein:
   the electronic controller is configured to determine if the second electrical power supply is storing sufficient electrical energy to operate the powered lock, and wherein the electronic controller generates a signal if the second electrical power supply is not storing sufficient electrical energy.

9. A vehicle door comprising:
   a movable handle that is mechanically connected to a latch having an electrically powered lock;
   first and second electrical power supplies;
   a wireless remote fob having user inputs that selectively cause electrical power to be supplied to the lock from the first or second electrical power supplies, whereby the latch can be unlocked utilizing power from a selected one of the first and second electrical power supplies.

10. The vehicle door of claim 9, wherein:
    the wireless remote fob includes first and second user inputs, and wherein the wireless remote fob generates a first wireless signal upon actuation of the first user input; and including:
    a first receiver configured to receive the first wireless signal, and wherein the first receiver is configured to cause the first electrical power supply to supply electrical power to the electrically powered lock such that the electrically powered lock is unlocked.

11. The vehicle door of claim 10, wherein:
    the wireless remote fob generates a second wireless signal upon actuation of the second user input; and including:
    a second receiver configured to receive the second wireless signal, and wherein the second receiver is configured to cause the second electrical power supply to supply electrical power to the electrically powered lock such that the electrically powered lock is unlocked.

12. The vehicle door of claim 11, wherein:
    the first and second user inputs comprise first and second pushbuttons.

13. The vehicle door of claim 12, wherein:
    the wireless remote fob is configured to receive first and second batteries, respectively, that supply power to generate the first and second wireless signals, respectively.

14. The vehicle door of claim 9, wherein:
    the first electrical power supply comprises a main vehicle battery;
    the second electrical power supply comprises a backup power supply having sufficient electrical power to actuate the electrically powered lock even if the main vehicle battery fails.

15. A vehicle door including a door structure and a keyless door latch system, the keyless door latch system comprising:
    a door latch;
    a powered lock that selectively prevents unlatching of the door latch when the powered lock is in a locked state;
    first and second electrical power supplies;
    a user input device having first and second user input features; and wherein:
    the door latch system is configured to supply electrical power from the first electrical power supply to the powered lock to unlock the powered lock upon actuation of the first user input feature, and wherein the system is configured to supply electrical power from the second electrical power supply to unlock the powered lock upon actuation of the second user input feature.

16. The vehicle door of claim 15, wherein:
the user input device comprises a wireless portable device that is configured to generate a first wireless signal upon actuation of the first user input feature, and to generate a second wireless signal upon actuation of the second user input feature; and including:
first and second receivers operably connected to the first and second electrical power supplies, respectively, and wherein the first and second receivers are configured to receive the first and second wireless signals, respectively, to unlock the powered lock.

17. The vehicle door of claim 16, wherein:
the wireless portable user input device includes a first battery that is operably connected to the first user input feature, and a second battery that is operably connected to the second user input feature.

* * * * *